UNITED STATES PATENT OFFICE.

WILLIAM GODSON LINDSAY, OF CALDWELL, NEW JERSEY, ASSIGNOR TO THE CELLULOID COMPANY, A CORPORATION OF NEW JERSEY.

NON-INFLAMMABLE CELLULOSE COMPOUND.

1,199,798. Specification of Letters Patent. Patented Oct. 3, 1916.

No Drawing. Original application filed May 5, 1909, Serial No. 494,178. Divided and this application filed September 10, 1912. Serial No. 719,543.

*To all whom it may concern:*

Be it known that I, WILLIAM GODSON LINDSAY, a citizen of the United States, residing at Caldwell, in the county of Essex and State of New Jersey, have invented certain new and useful Improvements in Non-Inflammable Cellulose Compounds, of which the following is a full, clear, and exact specification.

This invention relates to a new composition of matter which is non-inflammable, and which possesses permanently great strength and tenacity, and can be used as a substitute for nitro-cellulose compositions such as celluloid and similar substances, and also to the process of making the same.

More particularly, this invention relates to producing a cellulose ester, preferably an acetyl cellulose, combined with substances for effecting non-inflammability and permanency of strength and tenacity.

The present application is a division of my application No. 494,178, filed May 5, 1909.

Heretofore, it has been proposed to substitute acetyl cellulose for nitro-cellulose in the manufacture of compounds of which celluloid is a prominent example. But so far as I am now aware, such compounds have been unsuccessful, principally for the reason that the compounds were not sufficiently strong and not sufficiently tenacious, whether obtained by evaporation from a solution or by manipulating a plastic mass, nor have they been non-inflammable.

In carrying out my invention, I select an acetyl cellulose which is soluble in acetone; however, I may use any other variety of acetyl cellulose in combination or in solution or mixture, or other suitable substance which is soluble in a menstruum that dissolves triphenylphosphate. A solution is made of such acetyl cellulose or similar basic ingredients in acetone and to this solution is added triphenylphosphate, either in solid form or previously dissolved in acetone or other similar solvent. The amount of triphenylphosphate or equivalent substance may be varied in proportions from ten to twenty parts by weight to each one hundred parts of the acetyl cellulose, and the acetone or other suitable solvent is added in sufficient quantity to make either a flowable solution or a plastic mass, as is well understood by those skilled in the art; but I do not limit myself to any specific proportions because they may be diminished or increased as desired.

The addition of triphenylphosphate increases both the strength and tenacity and also insures non-inflammability. This increase in strength and tenacity may, as I have found by experiment, be secured in greater or less degree by substances which are to a large extent equivalents of triphenylphosphate, such as diphenylamin, &c.

As indicated above, the solvent or menstruum may be formed of one or more substances in addition to, or in substitution of, acetone; in fact, any one or more of the solvents or menstrua of an acetyl cellulose, or similar cellulose composition, may be employed, provided the solvent is also a solvent of the triphenylphosphate or other substance used in place thereof. Numerous instances of such solvent or menstruum of one or more ingredients might be cited; it may be stated that chloroform, ethyl acetate, acetylene tetrachlorid, alcohol and like substances, generally alone, or two or more taken together, are capable of dissolving or forming a menstruum for the acetyl cellulose, or like substances, in the presence of triphenylphosphate, or similar ingredient or ingredients. A further advantage in employing these solvent or menstrua substances in the case of some of the heavy solvents arises from their property of restraining or modifying the volatility of the mixture and thus increasing the tensile strength and elasticity of the resultant product; acetylene tetrachlorid, when used alone, or with chloroform, alcohol, ethylacetate, or the like, in varying proportions is especially useful in this connection.

By the addition of about 1½% of urea, still greater permanency and tenacity will be imparted to my compound. The proportion of urea or equivalent substance will vary according to the desired degree of increased strength and the stability of final product. A proportion of two parts urea to one hundred parts of the cellulose compound gives most excellent results; a less proportion is sufficient for ordinary purposes. I have obtained satisfactory results with a proportion of urea as low as one part to one hundred parts of the cellulose compound.

For certain purposes, it is advantageous to make a thorough mechanical mixture containing the acetyl cellulose and triphenylphosphate, or equivalent substances, and subsequently add the solvent or liquid menstruum.

The product made in accordance with my invention can be made in the form of films or thin sheets. Any approved method of forming films or thin sheets from a flowable solution may be employed. It will be understood, also, that the flowable solution formed as above described may be applied as a protecting surface, such a coating possessing also the property of being waterproof. The final product may also be made in the form of a mass of any desired thickness.

It will be obvious that suitable pigments or coloring matter may be added to the above mixture or solution to produce a final product for use in imitating other substances, such as amber, ivory, horn, marble, or the like.

Where I employ the expression "acetyl cellulose soluble in acetone" in the claims, it is to be understood that I mean such variety of acetyl cellulose which is freely soluble in acetone, and that this variety of acetyl cellulose is substantially completely soluble in acetone.

Having thus described my invention, I declare that what I claim as new and desire to secure by Letters Patent is:

1. A product containing a cellulose ester and diphenylamin obtained by dissolving the same in a solvent common to both, and then permitting the solution to dry and harden by evaporation.

2. A product containing an acetyl cellulose and diphenylamin obtained by dissolving the same in a solvent common to both, and then permitting the solution to dry and harden by evaporation.

3. A product containing an acetyl cellulose soluble in acetone and diphenylamin obtained by dissolving the same in a solvent common to both, and then permitting the solution to dry and harden by evaporation.

4. A product containing a cellulose ester and diphenylamin obtained by dissolving the same in acetone, and then permitting the solution to dry and harden by evaporation.

5. A product containing an acetyl cellulose and diphenylamin obtained by dissolving the same in acetone, and then permitting the solution to dry and harden by evaporation.

In testimony whereof I affix my signature, in presence of two witnesses.

WILLIAM GODSON LINDSAY.

Witnesses:
H. C. EGAN,
GEO. N. KERR.